United States Patent
Classen et al.

(10) Patent No.: US 7,487,842 B2
(45) Date of Patent: Feb. 10, 2009

(54) TURF AERATOR

(75) Inventors: Larry Classen, Norfolk, NE (US); Tony J. Bettin, Norfolk, NE (US)

(73) Assignee: Schiller-Pfeiffer, Inc., Southampton, PA (US)

( * ) Notice: Subject to any disclaimer, the term of this patent is extended or adjusted under 35 U.S.C. 154(b) by 0 days.

(21) Appl. No.: 12/044,289

(22) Filed: Mar. 7, 2008

(65) Prior Publication Data

US 2008/0149357 A1 Jun. 26, 2008

Related U.S. Application Data

(60) Division of application No. 11/017,294, filed on Dec. 20, 2004, now Pat. No. 7,341,114, which is a continuation-in-part of application No. 10/936,804, filed on Sep. 9, 2004, now Pat. No. 7,100,702.

(51) Int. Cl.
- *A01B 33/00* (2006.01)
- *A01B 45/00* (2006.01)
- *A01B 45/02* (2006.01)

(52) U.S. Cl. .......................... 172/22; 172/114; 172/122

(58) Field of Classification Search .................... 172/21, 172/22, 114–116, 122, 518, 536; 404/122, 404/132

See application file for complete search history.

(56) References Cited

U.S. PATENT DOCUMENTS

| | | | |
|---|---|---|---|
| 322,422 A | 7/1885 | Collyer et al. | |
| 1,645,028 A | 10/1927 | Stone | |
| 1,911,693 A | 5/1933 | Jones | |
| 2,384,805 A | 9/1945 | Arens | |
| 2,987,975 A | 6/1961 | Seaman | |
| 3,309,972 A | 3/1967 | Hermann | |
| 3,756,203 A | 9/1973 | Dedoes | |
| 4,015,668 A | 4/1977 | Wilson | |
| 4,052,912 A | 10/1977 | Vukelic | |
| 4,157,877 A | 6/1979 | Lee | |
| 4,316,355 A | 2/1982 | Hoff | |
| 4,354,569 A | 10/1982 | Eichholz | |
| 4,550,783 A | 11/1985 | Hansen | |
| 4,704,045 A | 11/1987 | Taylor et al. | |
| 4,776,404 A | 10/1988 | Rogers et al. | |
| 5,101,910 A | 4/1992 | Dawson | |
| 5,207,289 A | 5/1993 | Wilmo | |
| 5,673,756 A | 10/1997 | Classen | |
| 5,680,903 A | 10/1997 | Oliver | |
| 5,797,458 A | 8/1998 | Simon et al. | |
| 6,102,129 A | 8/2000 | Classen | |

(Continued)

FOREIGN PATENT DOCUMENTS

GB 2164231 3/1986

*Primary Examiner*—Christopher J. Novosad
(74) *Attorney, Agent, or Firm*—Panitch Schwarze Belisario & Nadel LLP

(57) ABSTRACT

A safety mechanism for a turf aerator having a frame and an engine with a governor that generally prevents the turf aerator from operating at full power unless the safety mechanism is engaged. A blocking mechanism and a manual actuation device are mounted to the frame. The manual actuation device is in mechanical communication with the blocking mechanism. The blocking mechanism urges the governor toward a loaded position and the engine operates at a generally low power when the governor is in the loaded position.

7 Claims, 9 Drawing Sheets

U.S. PATENT DOCUMENTS

| | | |
|---|---|---|
| 6,422,321 B1 | 7/2002 | Dillon |
| 6,494,270 B1 | 12/2002 | Lawson |
| 6,513,603 B2 | 2/2003 | Bjorge |
| 6,585,451 B2 | 7/2003 | Wynings |
| 6,659,190 B2 | 12/2003 | Jessen |
| 6,684,960 B1 | 2/2004 | Ng et al. |
| 6,708,773 B1 | 3/2004 | Kinkead et al. |
| 2004/0154811 A1 | 8/2004 | Kinkead et al. |

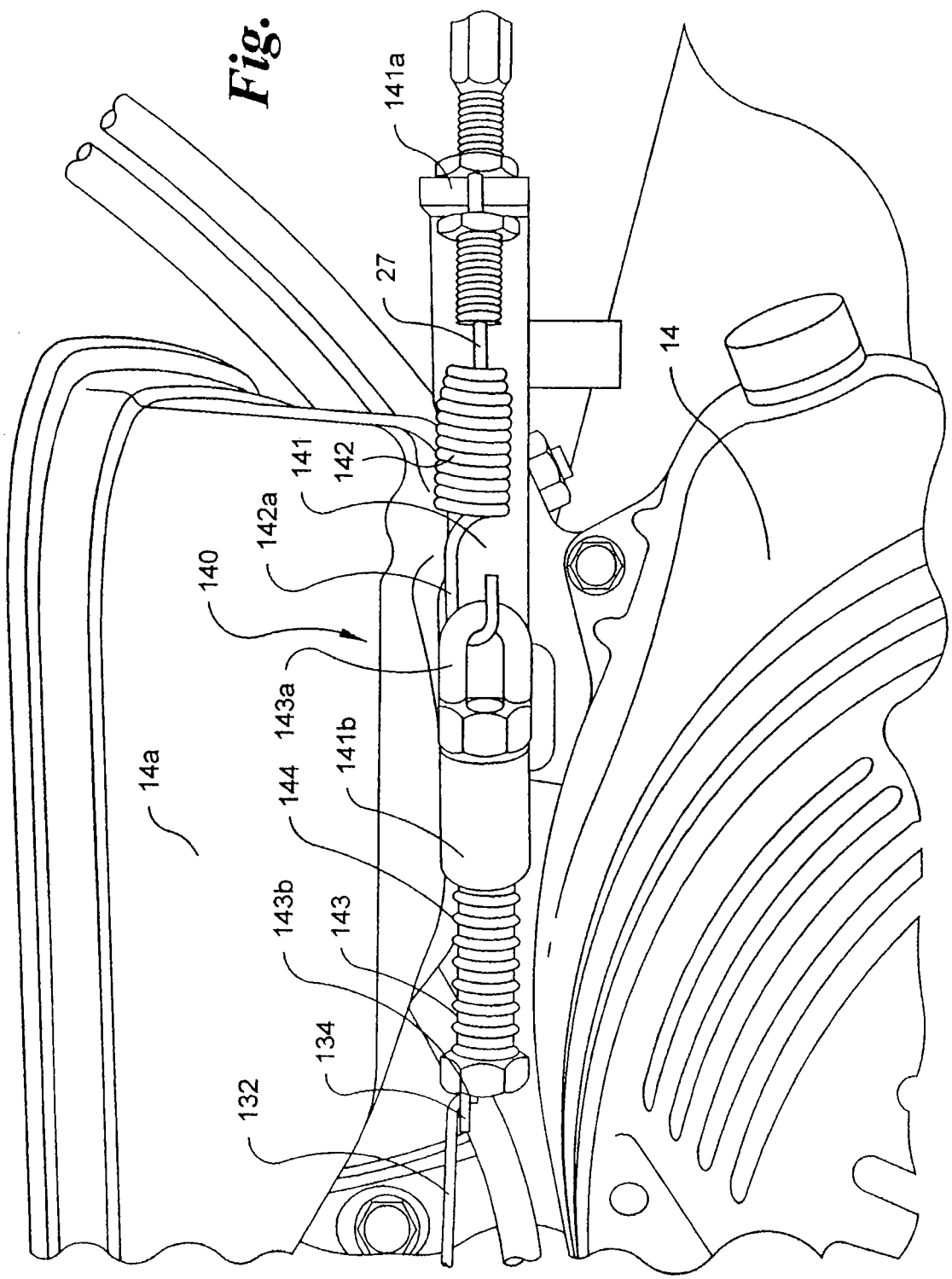

TURF AERATOR

CROSS-REFERENCE TO RELATED APPLICATIONS

This patent application is a divisional of U.S. patent application Ser. No. 11/017,294, filed Dec. 20, 2004, which is a continuation of U.S. Pat. No. 7,100,702, issued Sep. 5, 2006.

BACKGROUND OF THE INVENTION

The present application is directed to a turf aerator and more specifically to an aerator having three separate shafts in axial alignment with each other with the tine assemblies on the middle shaft being mounted for free wheel rotation and the tine assemblies on the left and right shafts being mounted for rotation with the left and tight shafts which may be selectively driven or simultaneously driven.

Core-type aerators are well known in the art and are generally comprised of a walk-behind unit having a main frame with an internal combustion engine mounted on the top thereof. A transverse shaft is rotatably mounted adjacent a lower rear portion of the frame and has plurality of discs secured thereto which in turn support a plurality of radially extending core tines. A suitable drive arrangement is provided between the output shaft of the motor and the tine carrying shaft. A pair of adjustable wheels are pivotally mounted on opposite sides of the frame adjacent the rear thereof which may be adjustable in height under the control of an operator walking behind the aerator. Suitable controls are provided on the handle for controlling the drive to the shaft carrying the care tines. In most models of turf aerators, all of the tine carrying discs are simultaneously rotated since they are mounted on a single transverse shaft to which the drive is imparted. At least one turf aerator model is provided wherein the outermost tine carrying discs are mounted on the shaft for a free wheeling operation The aerator disclosed in U.S. Pat. No. 6,102,129 is of the walk behind type and is provided with two independent tine carrying shafts which are axially aligned with each other for independent rotation relative to each other. Each shaft is selectively connected to an output shaft of a motor mounted on the frame of the aerator by two separate drive trains, each having a clutch arrangement therein. A pair of control levers is mounted on a handle assembly for operating the clutches in each drive train. Thus either or both of the tine carrying shafts may be rotated to facilitate a turning operation of the aerator or while traversing a sloping surface.

The aerator disclosed in U.S. Pat. No. 5,680,903 is provided with a series of tine assemblies spaced along a driven shaft driven by a motor. Each tine assembly has a plurality of tines for aeration extending in a substantially radial pattern about the driven shaft. The inner tine assemblies along the middle portion of the driven shaft are secured to the driven shaft to drive the aerator along the lawn as the driven shaft rotates. The outer tine assemblies adjacent the ends of the driven shaft are rotatably mounted on the driven shaft. This permits the outer tine assemblies to free wheel independently and thereby make the aerator more maneuverable and easier to turn.

SUMMARY OF THE INVENTION

The present invention provides an improved turf aerator having three separate shafts in axial alignment with each other with the tine assemblies on the middle shaft being mounted for free-will rotation and the tine assemblies on the left and Might shafts mounted for rotation with the shafts which may be selectively or simultaneously driven. The turf aerator is provided with a platform upon which the operator will stand to operate the turf aerator. An internal combustion engine is operatively connected to two hydraulic pumps which in turn are connected to left and right hydraulic motors respectively, which will impact a drive to the left and right tine carrying shafts respectively. The hydraulic motors also provide a drive for the left and right main wheels of the turf aerator respectively.

BRIEF DESCRIPTION OF THE DRAWINGS

The foregoing summary, as well as the following detailed description of preferred embodiment of the present invention, will be better understood when read in conjunction with the appended drawings. For the purpose of illustrating the preferred turf aerator of the present invention, there is shown in the drawings, an embodiment which is presently preferred. It should be understood, however, that the invention is not limited to the precise arrangements and instrumentalities shown. In the drawings:

FIG. 7A is a magnifies left-side perspective view of the turf aerator of FIG. 1, showing a preferred blocking mechanism of the turf aerator.

DETAILED DESCRIPTION OF THE INVENTION

Figure 1:
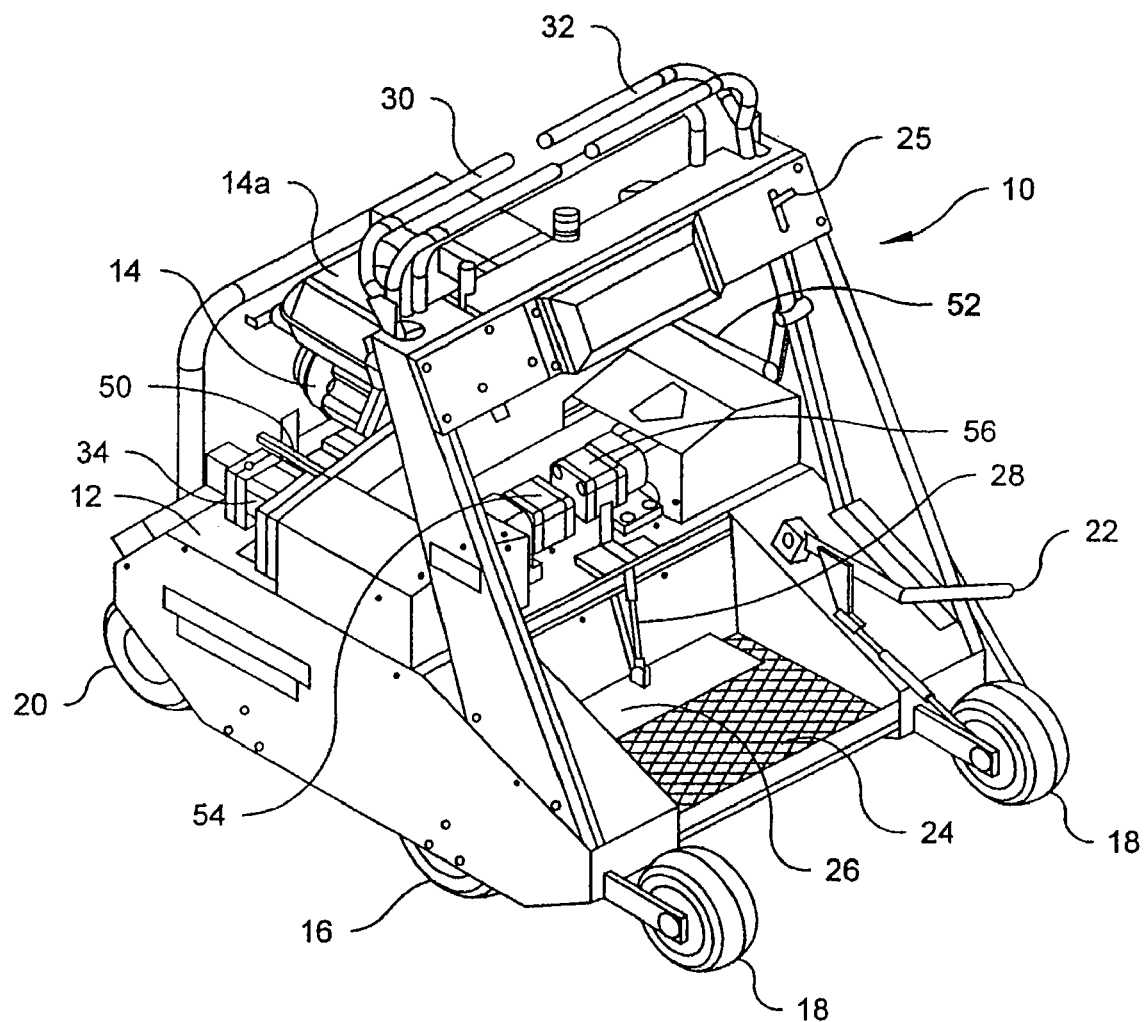
FIG. 1 is a top perspective view of the preferred turf aerator of the present invention.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the turf aerator and designated parts thereof. The terminology includes the above-listed words, derivatives thereof and words of similar import.

Referring to the drawings in detail, wherein like numerals indicate like elements throughout, there is shown in FIGS. 1-7B, a preferred embodiment of a turf aerator, generally designated 10, for aerating turf, or, specifically, a lawn. Referring to FIGS. 1-4, the turf aerator 10 includes a main frame 12 having an internal combustion engine 14 mounted on an upper portion thereof. The main frame 12 is supported by a pair of rotatable driven wheels 16, two smaller non-driven wheels 18 on the rear position of the frame 12 and two even smaller non-driven wheels 20 mounted on the front portion of the frame 12. The two smaller non-driven wheels 18 can be raised and lowered by a lever 22 to stabilize; the aerator 10.

Figure 2:
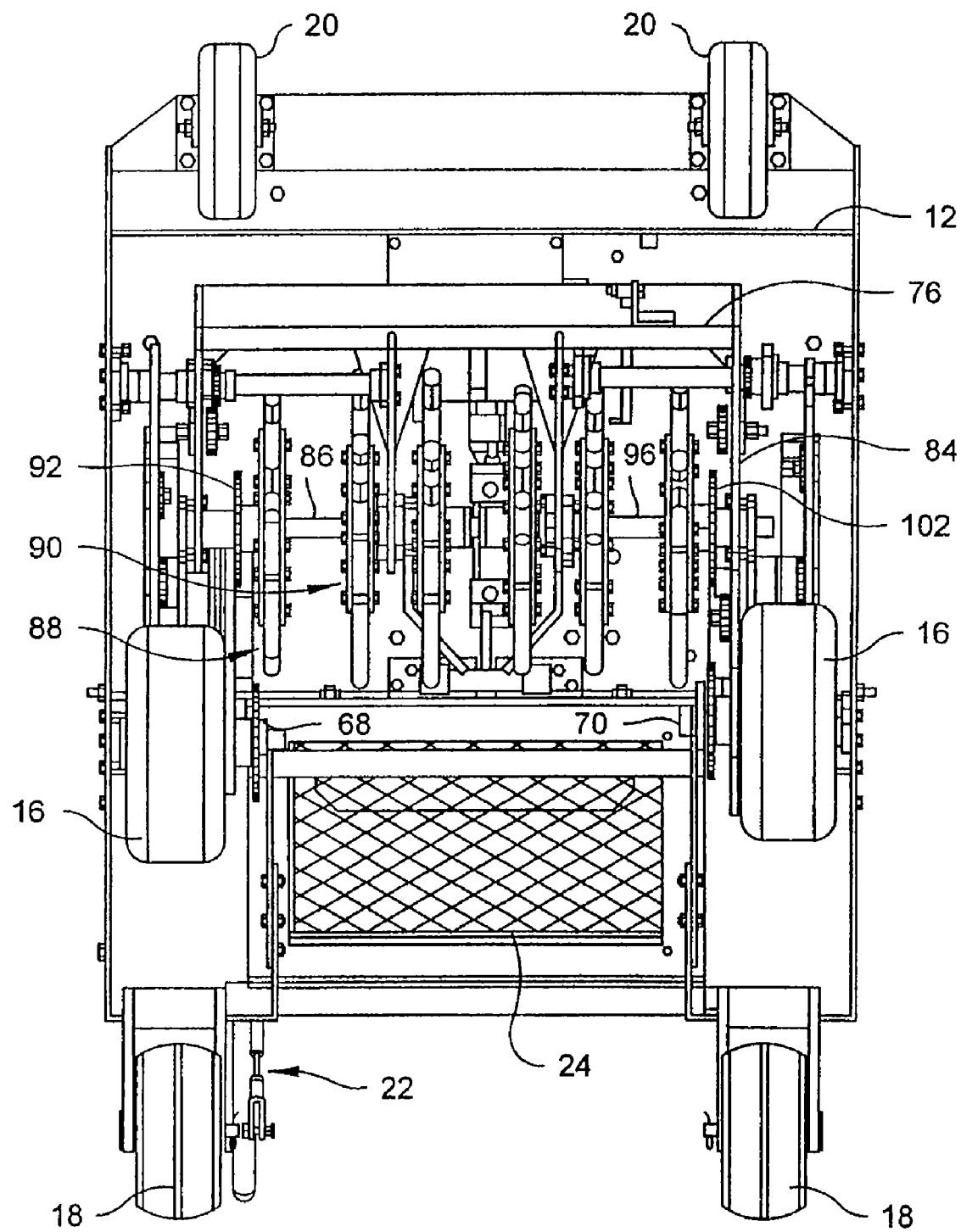
FIG. 2 is a bottom plan view of the turf aerator of FIG. 1, showing the relationship of time carrying shafts relative to drive wheels.

A platform 24 for the operator is mounted on the frame 12 substantially between the driven wheels 16 and the rear non-driven wheels 18, as best seen in FIG. 2. A manual actuation device 26 is mounted at the forward side of the platform 24 away from the front of the turf aerator 10 and a tine assembly 58. The manual actuation device 26 is typically comprised of a treadle or a foot pedal 26 that is pivotally mounted to the platform 24. When the treadle 26 is depressed by the operator, the engine 14 can be controlled by the throttle lever 25. When the treadle 26 is not depressed, the engine 14 can only operate to idle speed regardless of the operation of the throttle lever 25. Accordingly, the operator is behind the turf aerator 10 and generally is unable to contact the tine assembly 58 when the turf aerator 10 is operating or working when the tine assembly 58 is rotating.

Referring to FIGS. 1, 3, and 6-7B, the treadle 26 provides a safety feature for the turf aerator 10 in that the engine 14 will operate at idle or low power unless the treadle 26 is depressed by the operator and the turf aerator 10 will generally not move or operate unless the treadle 26 is depressed. Therefore, when the engine 14 is operating at the low or idle power, the turf aerator 10 generally does not move and the tine assembly 58 generally does not rotate such that an operator could potentially be struck by the moving turf aerator 10 or impacted by the rotating tine assembly 58. This safety feature includes the treadle 26, an engine governor 130 that is connected to the engine 14 and a blocking mechanism 140 that is mounted to the engine 14 and is in mechanical communication with the treadle 26. The operation of the engine governor 130, the components of the engine governor 130 and the relationship between the engine governor 130, the engine 14 and the throttle lever 25 is generally understood by one having ordinary skill in the art and will not be described in detail.

Figure 6:
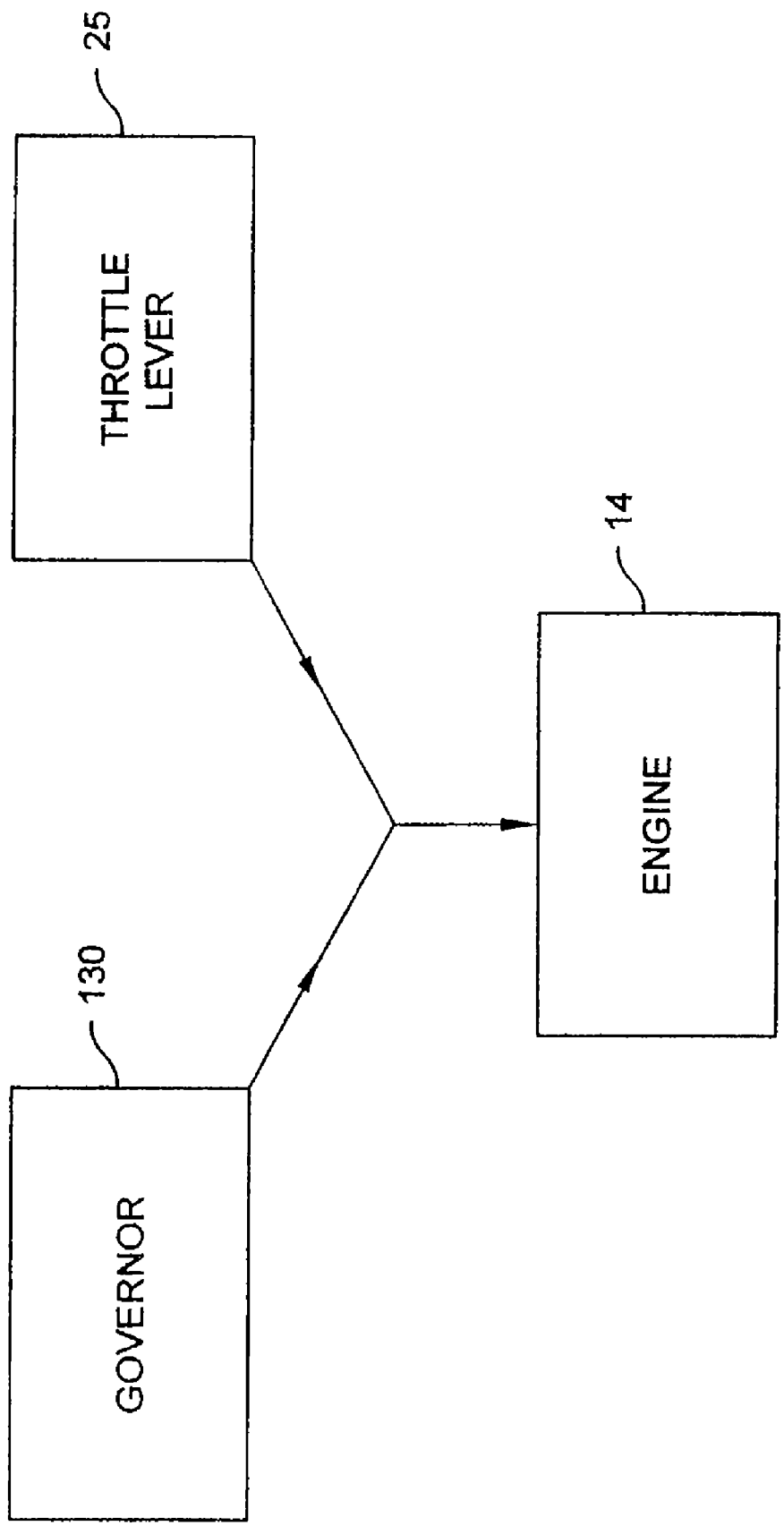
FIG. 6 is schematic block diagram of an engine, governor and throttle lever of the turf aerator of FIG. 1.
Figure 7:
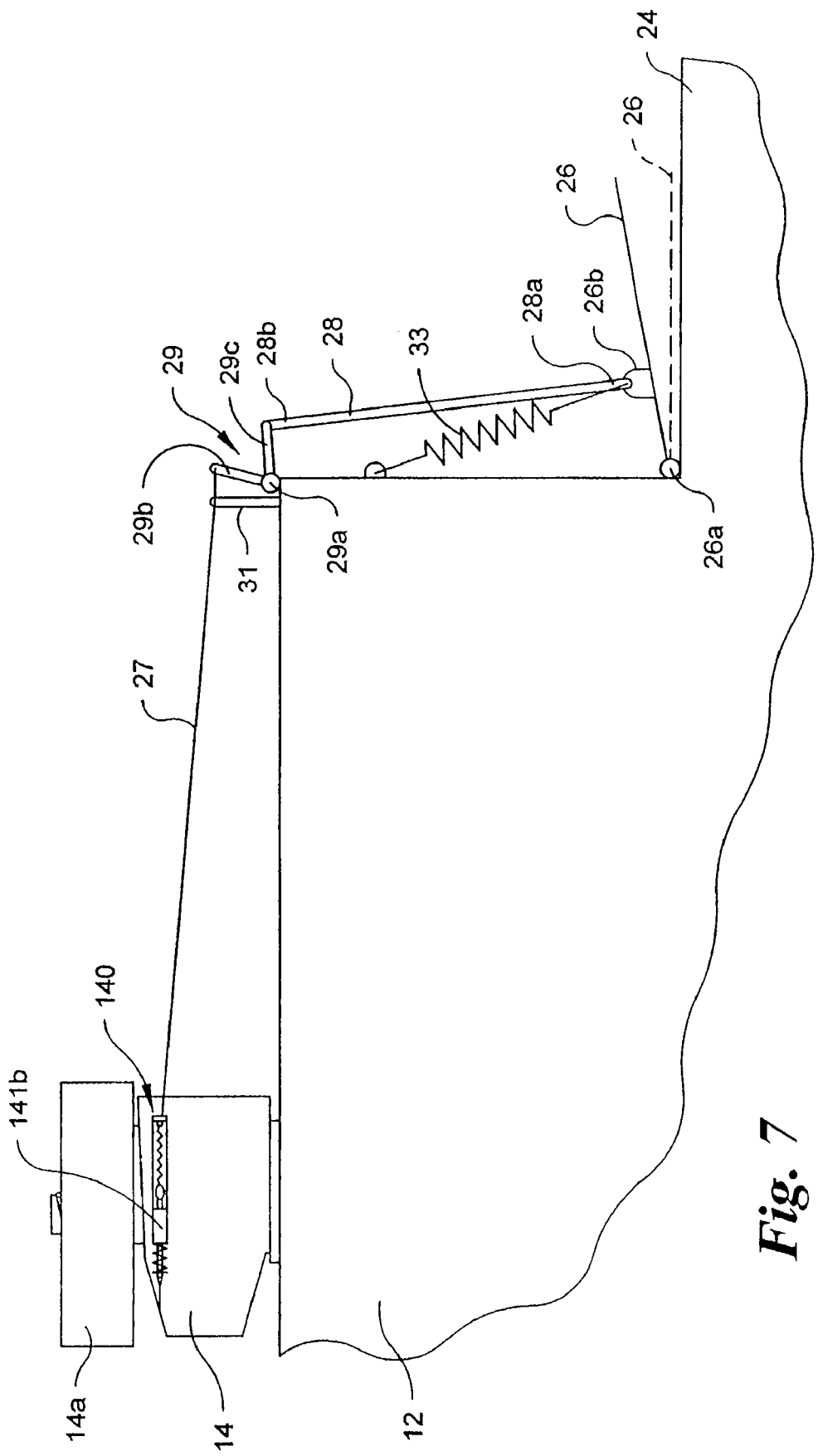
FIG. 7 is a partial left-side elevational view of the turf aerator of FIG. 1.
Figure 7B:
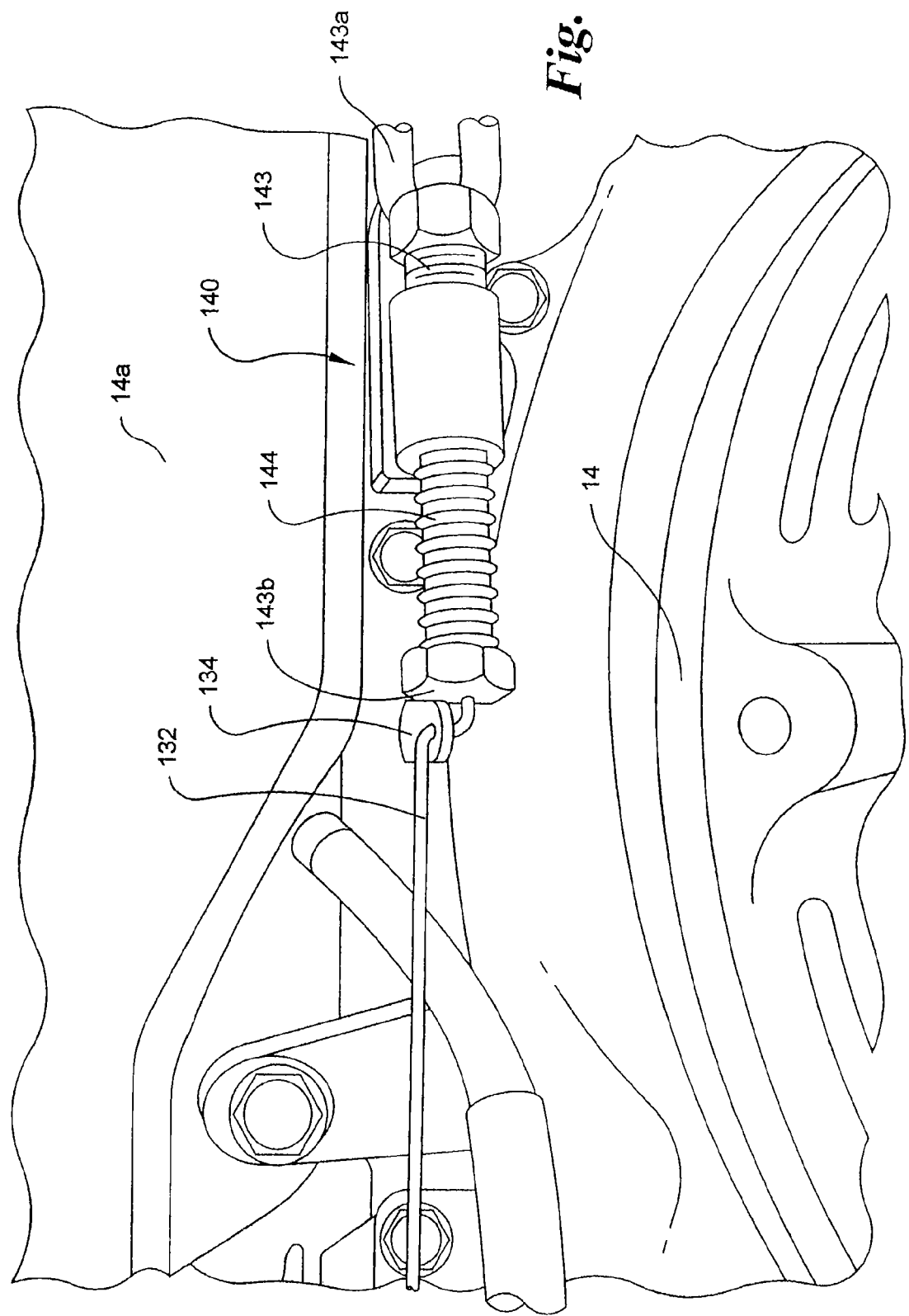
FIG. 7B is a magnified left-side perspective view of the turf aerator of FIG. 1, showing the blocking mechanism of the turf aerator.

Referring to FIGS. 6-7B, in the preferred embodiment, the engine 14 is comprised of a thirteen horsepower (13 Hp) internal combustion engine but is not so limited. The engine 14 is provided with fuel by a fuel tank 14a that is preferably mounted above the engine 14. The engine 14 is also in communication with the throttle lever 25 and the governor 130 to regulate its operation. The governor 130 includes a governor actuating arm 132 and a governor lever 134. The governor 130 including the actuating arm 132 and the governor lever 134 is movable to and between a biased position (not shown) and a loaded position (FIG. 7A). In the loaded position, the governor 130 regulates the engine 14 to operate at idle or low power, as was described above.

The treadle 26 is pivotally mounted to the frame 12, preferably at a hinge 26a, that permits pivoting of the treadle 26 between the depressed position (dashed in FIG. 7) and an extended position (solid in FIG. 7). A first end 28a of a treadle arm 28 is mounted to the treadle 26 rearwardly of the hinge 26a at a treadle lug 26b. A second end 28b of the treadle arm 28 is mounted to a pivoting bracket 29, which is pivotally mounted to the frame 12 at a bracket hinge 29a. The pivoting bracket 29 includes a first leg 29b and a second leg 29c. The second leg 29c is mounted to the second end 28b of the treadle arm 28 and the first leg 29b is mounted to an actuating cable 27. The actuating cable 27 extends from its attachment with the first leg 29b, through an eyelet fixture 31 and is connected at an opposite end to the blocking mechanism 140. A spring 33 is mounted between the treadle lug 26b and the frame 12 and generally biases the treadle 26 to the extended position.

Referring to FIGS. 7-7B, the blocking mechanism 140 is preferably mounted to the engine 14 and is in communication with the actuating cable 27 and the governor 130. The blocking mechanism 140 preferably includes a blocking bracket 141 with a first side 141a and a generally hollow tube 141b at an opposite side, a spring member 142 that is mounted to the actuating cable 27 and an actuating shaft 143 that is movably mounted within the hollow tube 141b and is typically in facing contact with a butt end 143b of the governor lever 134 when the treadle 26 is in the extended position. The blocking bracket 141 is preferably constructed of a generally rigid metallic material and is bolted or otherwise secured to the engine 14. The spring member 142 is secured at one end to the actuating cable 27 and includes a hook 142a at an opposite end that is secured to a lug 143a of the actuating shaft 143. The actuating shaft 143 is movably mounted to the hollow tube 141b and is biased toward a blocking position by a spring 144. The actuating shaft 143 is movable to and between the blocking position and an operating position relative to the hollow tube 141b. When the actuating shaft 143 is in its operating position, the butt end 143b may not be in contact with the governor lever 134 and the governor lever 134 and the governor actuating arm 132 generally operate in a conventional manner. The blocking mechanism 140 is not limited to the above-described structure and may be comprised of nearly any structure that is able to manipulate the governor 130 in a below-described manner to provide a safety measure for the turf aerator in the typical operating conditions of the turf aerator 10.

Referring to FIGS. 6-7B, in operation, the engine 14 is started by an operator and the treadle 26 is in the extended position. In the extended position, the actuating shaft 143 is in the blocking position and contacts the governor lever 134 to urge the governor lever 134 to the loaded position. As was described above, when the governor lever 134 is in the loaded position, the engine 14 operates at an idle or low power. Accordingly, even if the operator urges the throttle lever 25 to a high speed, the governor 130 directs the engine 14 to operate at the idle or low power. To utilize the turf aerator, the operator stands on the treadle 26 or otherwise moves the treadle 26 from the extended position to the depressed position. The operator applies a force to the treadle 26 such that the biasing force of the spring 33 connected to the frame 12 and the treadle lug 26b is overcome to move the treadle 26 from the extended position to the depressed position. This movement of the treadle 26 moves the treadle arm 28 in a downward direction, thereby causing the pivoting bracket 29 to pivot about the bracket hinge 29a urging the actuating cable 27 through the eyelet fixture 31 toward the operator or away from the engine 14. The actuating cable 27 urges the actuating shaft 143 from the blocking position to the operating position against the bias of the spring 144. In the operating position of the actuating shaft 143, the governor lever 134 is able to move to its biased position. In the biased position, the governor 130 generally permits the throttle lever 25 to control the power lever and operation of the engine 14 in a typical manner. In contrast, the biasing of the governor 130 to the loaded position when the actuating shaft 143 is in the blocking position permits the engine to preferably run at only the idle or low power. As one having ordinary skill in the art will understand, the engine 14, governor 130 and throttle lever 25 operate in a typical manner for a small engine when the actuating shaft 143 is in the operating position. When the treadle 26 is depressed and the engine 14, governor 130 and throttle lever 25 are operating in their typical operating manners, the engine 14 is able to power the driven wheels 16 and the tine assembly 58 to aerate a surface that the turf aerator 10 moves along.

Referring to FIGS. 1-4, a pair of operating handles 30, 32 is pivotally mounted on the frame 12 and is operatively connected to a left hydraulic pump 34 and a right hydraulic pump 36 by control links 50, 52, respectively. The internal combustion engine 14 is provided with an output shaft 38 having a pair of pulleys 40 mounted thereon. Rotation of the drive shrift 38 is imparted to the left and right hydraulic pumps 34, 36 by means of respective belts 42, 44, which are entrained about pulleys 46, 48 of the left and right hydraulic pumps 34, 36. The control links 50, 52 are connected to the respective control handles 30, 32 at one end thereof. The opposite ends of the control links 50, 52 are operatively connected to the hydraulic pumps 34, 36, respectively, one of the connections being shown in FIG. 1. Thus, the output and pressure of the hydraulic fluid from the left and right hydraulic pumps 34, 36 to left and right hydraulic motors 54, 56 may be varied to vary the speed of the hydraulic motors 54, 56. The details of such hydraulic pumps 34, 36 and hydraulic motors 54, 56 are well known in the art and are not described in further detail.

Figure 3:
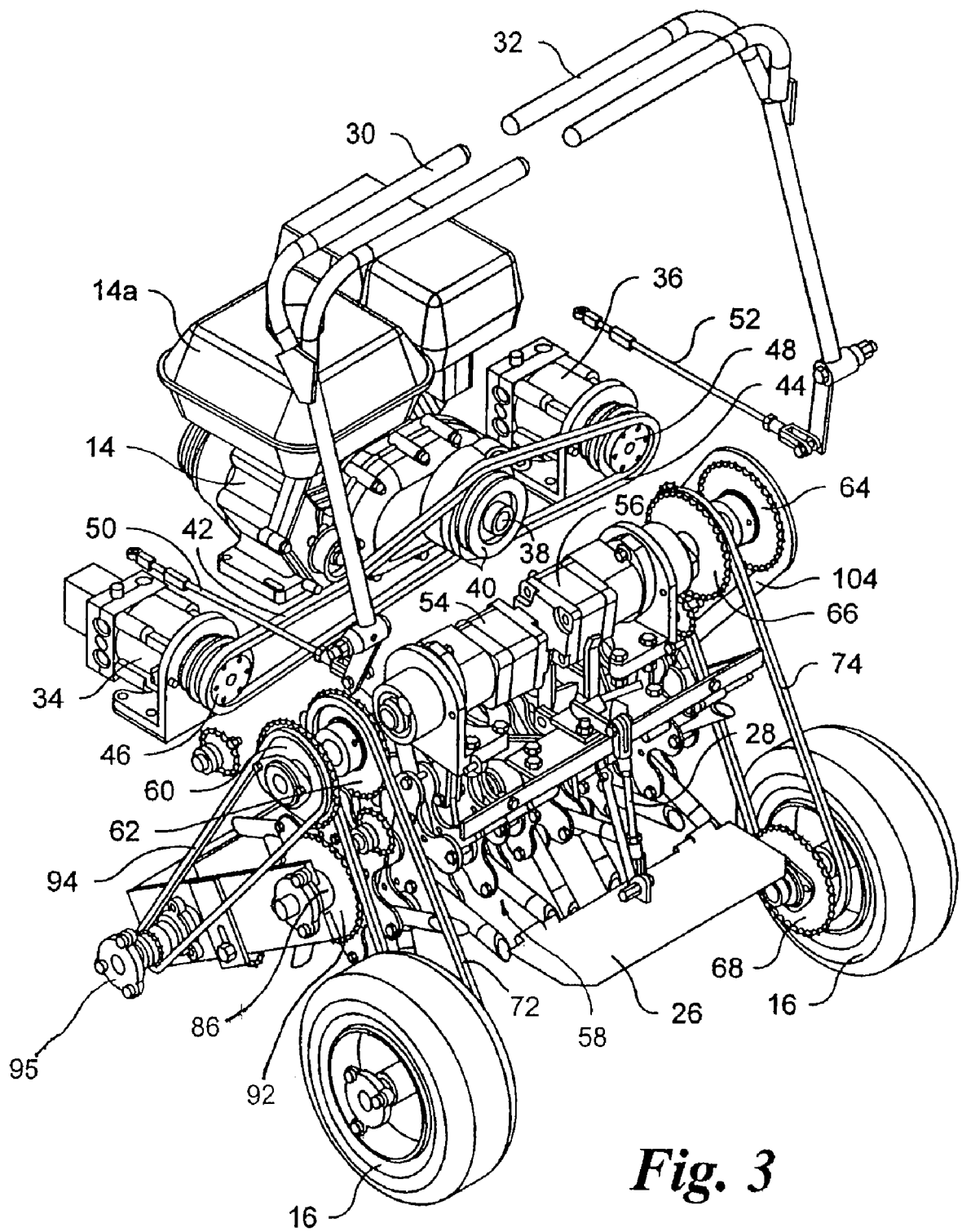
FIG. 3 is a partially exploded, perspective view of the turf aerator of FIG. 1.

The left hydraulic motor 54 and the right hydraulic motor 56 are mounted on the frame 12 above a tine assembly 58, as best seen in FIG. 3. A pair of sprocket wheels 60, 62 is mounted on an output shaft of the left hydraulic motor 54 and a pair of sprocket wheels 64, 66 is mounted on an output shaft of the right hydraulic motor 56. The drive wheels 16 are each provided with a sprocket wheel 68, 70. A chain 72 is entrained about the sprocket wheel 62 on the output shaft of the left hydraulic motor 54 and the sprocket wheel 70 on the left drive wheel 16, as viewed in FIG. 3. A chain 74 is also entrained about the sprocket wheel 66 on the drive shaft of the right side hydraulic motor 56 and the sprocket wheel 68 on the right drive wheel 16, as viewed in FIG. 3. Thus the drive wheels 16 are driven by the left and right hydraulic motors 54, 56.

Figure 4:
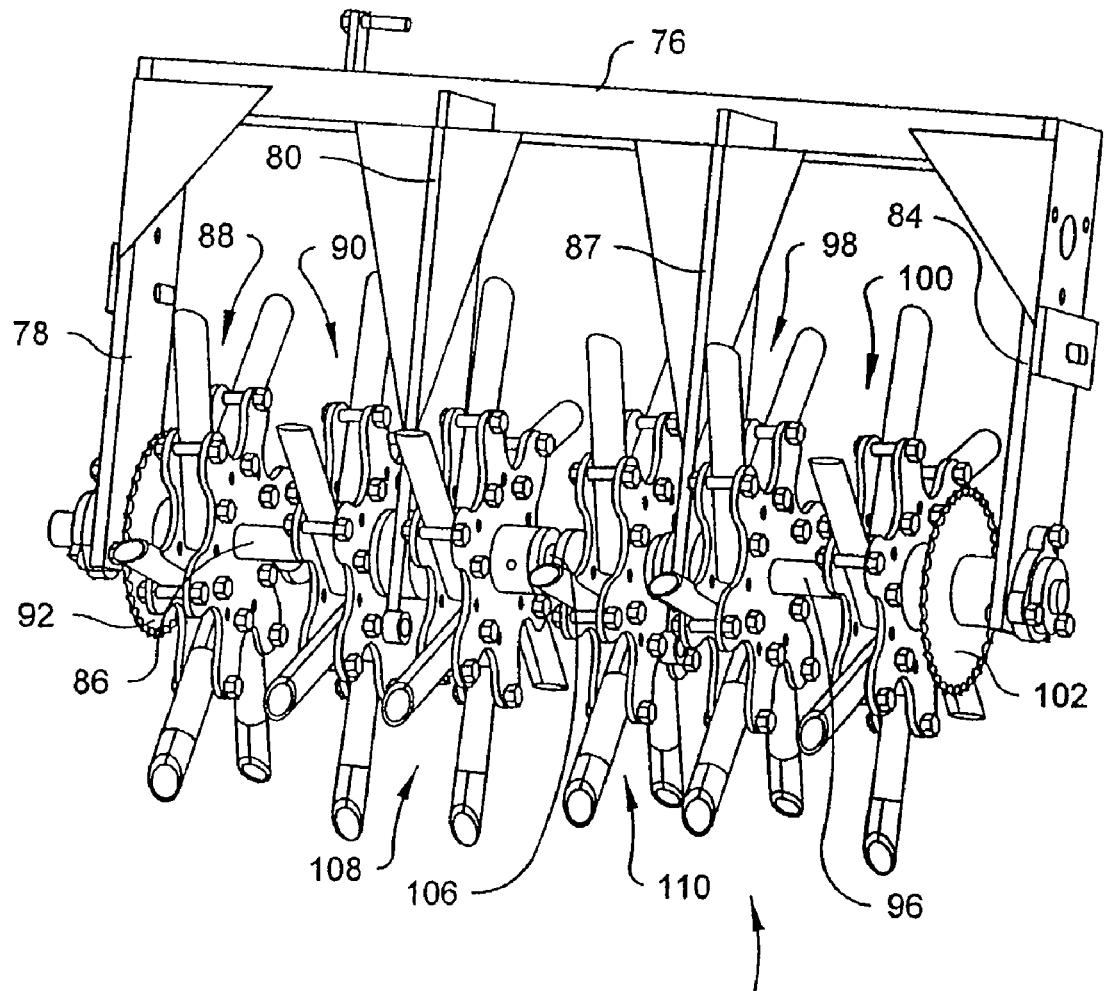
FIG. 4 is a front perspective view of a tine assembly of the turf aerator of FIG. 1.

The tine assembly 58, as best seen in FIGS. 2 and 4, is comprised of a transverse frame 76 having four depending supports 78, 80, 87, and 84. A first shaft 86 is rotatably mounted between the dependent supports 78, 80 and a pair of conventional tine assemblies 88, 90 is connected to the shaft 86 for rotation therewith. A sprocket wheel 92 is also mounted on the shaft 86 and is driven by a chain 93, which is in turn driven by a sprocket wheel (not shown) on a shaft 95, which is driven by a chain 94 and the sprocket wheel 60, which is driven by the left side hydraulic motor 54. A second shaft 96 is mounted for rotation between the supports 87, 84 and a pair of conventional tine assemblies 98, 100 is mounted on the shaft 96 for rotation therewith. A sprocket wheel 102 is also mounted on the shaft 96 and is driven by a chain and sprocket wheel (not shown) on a shaft (not shown) similar to the shaft 95 which is driven through a chain 104 trained about the sprocket wheel 64, which is driven by the right side hydraulic motor 56. A third shaft 106 is rotatably mounted between the supports 80, 87 and a pair of tine assemblies 108, 110 is rotatably mounted on the shaft 106 independently of each other. The third shaft 106 is not driven and, accordingly, the tine assemblies 108, 110 simply free wheel and receive their rotation by contact with the ground as the turf aerator 10 moves along the ground. The left and right shafts 86, 96 may be selectively or simultaneously rotated by the left and right hydraulic motors 54, 56 under the control of the levers 30, 32. As a result, the rotation of the left and right shafts 86, 96 and the conventional tine assemblies 88, 90, 98, 100 may be conveniently selected to assist the operator in turning the turf aerator 10 or traversing a slope with the turf aerator 10.

Figure 5:
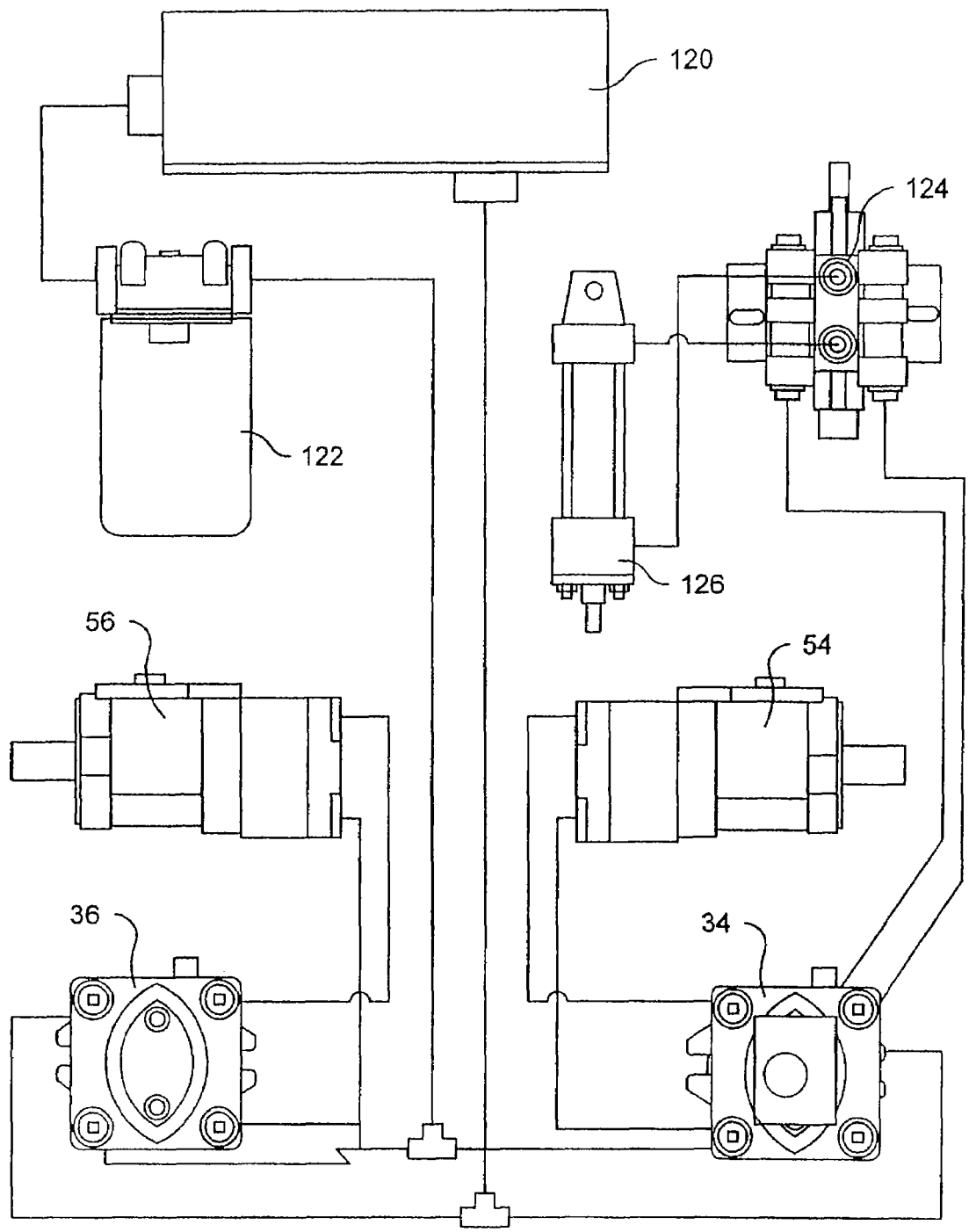
FIG. 5 is a schematic diagram of hydraulic circuitry of the turf aerator of FIG. 1.

Referring to FIG. 5, hydraulic circuitry interconnects the left and right hydraulic motors 54, 56 to the left and right hydraulic pumps 34, 36. In addition to the hydraulic motors 54, 56 and the hydraulic pumps 34, 36, a reservoir tank 120, a filter 122 and a control valve 124 are provided. In addition to controlling the hydraulic pumps 34, 36 and hydraulic motors 54, 56, the control valve 124 also controls a cylinder 126.

It will be appreciated by those skilled in the art that changes could be made to the embodiment described above without departing from the broad inventive concept thereof. It is understood, therefore, that this invention is not limited to the particular embodiment disclosed but is intended to cover modifications within the spirit and scope of the present invention, as defined by the appended claims.

We claim:

1. A safety mechanism for a turf aerator with a frame and an engine with a governor that generally prevents the turf aerator from operating at full power unless the safety mechanism is engaged, the safety mechanism comprising:
    a blocking mechanism mounted to the frame and including an actuating shaft movable to and between a blocking position and an operating position, the actuating shaft being biased toward the blocking position by a spring;
    a manual actuation device mounted to the frame and in mechanical communication with the blocking mechanism, the blocking mechanism urging the governor toward a loaded position, the engine operating at a generally idle power when the governor is in the loaded position.

2. The safety mechanism of claim 1 further comprising:
    a platform mounted to a first side of the frame; and
    a tine assembly mounted to an opposite side of the frame from the first side, wherein the manual actuation device is mounted to the frame proximate the first side such that an operator is able to manipulate the manual actuation device while standing on the platform.

3. The safety mechanism of claim 2 wherein the manual actuation device is comprised of a treadle that is pivotally mounted to the frame proximate the platform.

4. The safety mechanism of claim 3 wherein the treadle is mounted to a treadle arm, the treadle arm mounted to a pivoting bracket, the pivoting bracket mounted to an actuating cable, the actuating cable mounted to the blocking mechanism such that the blocking mechanism may be actuated by manipulation of the treadle.

5. The safety mechanism of claim 1, wherein the actuating shaft is slidably mounted to the engine within a hollow tube of a blocking bracket.

6. The safety mechanism of claim 1 further comprising:
    a throttle lever mounted to the frame, the throttle lever providing an operator control for the power of the engine, the throttle lever and governor operating together to set the operating power of the engine.

7. A safety mechanism for a turf aerator with a frame and an engine with a governor that generally prevents the turf aerator from operating at full power unless the safety mechanism is engaged, the safety mechanism comprising:
    a blocking mechanism mounted to the frame;
    a manual actuation device including a treadle, the treadle mounted to the frame and in mechanical communication with the blocking mechanism, the blocking mechanism urging the governor toward a loaded position, the engine operating at a generally idle power when the governor is in the loaded position.

\* \* \* \* \*